US006313246B1

(12) United States Patent
Carter et al.

(10) Patent No.: US 6,313,246 B1
(45) Date of Patent: *Nov. 6, 2001

(54) HIGH MOLECULAR WEIGHT ZWITTERIONIC POLYMERS

(75) Inventors: Phillip W. Carter, Naperville; Patrick G. Murray, Yorkville; Larry E. Brammer, Jr., Aurora; Andrew J. Dunham, Dekalb, all of IL (US)

(73) Assignee: Nalco Chemical Company, Naperville, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,054

(22) Filed: Jul. 7, 1999

(51) Int. Cl.$^7$ .................................................... C08F 26/06
(52) U.S. Cl. ...................... 526/258; 524/140; 524/141; 524/145; 524/386; 524/460
(58) Field of Search ................... 524/140, 141, 524/145, 386, 460; 526/258

(56) References Cited

U.S. PATENT DOCUMENTS

| | | |
|---|---|---|
| 3,269,991 | 8/1966 | La Combe . |
| 3,278,501 | 10/1966 | Bailey et al. . |
| 4,330,450 | 5/1982 | Lipowski et al. . |
| 4,363,886 | 12/1982 | Lipowski et al. . |
| 4,392,917 | 7/1983 | Lipowski et al. . |
| 4,822,847 | 4/1989 | Schulz et al. . |
| 5,240,982 | * 8/1993 | Farwaha et al. ............. 524/238 |
| 5,788,866 | 8/1998 | Fong et al. . |
| 5,846,558 | * 12/1998 | Nielsen et al. ............. 424/458 |
| 5,912,294 | * 6/1999 | Schade ............. 524/501 |
| 6,150,432 | 11/2000 | Jones et al. ............. 523/105 |

OTHER PUBLICATIONS

Encyclopedia of Polymer Science and Engineering, 1994, vol. 11, pp. 514–530, J.C. Salamone and W.C. Rice "Polyampholites".*

"A New Type of Polyampholyte: Poly(4–vinyl Pyridine Betaine)," Journal of Polymer Science, vol. 26, Iss. 113. pp. 251–254. (1957).

Cardoso, J., et al. "Polymeric Flocculants of the Zwitterionic Type," Polymer Pref., pp. 323–324. (1991).

Ishihara, K., et al., "Preparation of Phospholipid Polymers and Their Properties as Poylmer Hydrogel Membranes," Polymer Journal, vol. 22, No. 5, pp. 355–360. (1990).

McCormick, Charles, "Water soluble copolymers: 46. Hydrophilic sulphobetaine copolymers of acrylamide and 3–(2–acrylamido–2–methylpropanedimethyl–ammonio)–1–propanesultphonate," Polymer, vol. 33, No. 21, p. 4617. (1992).

Orta de Velasquez, M. T., et al, "New Polymeric Coagulants Tested in Water and Wastewater," Environmental Technology, vol. 19, pp. 323–330. (1998).

Salamone, J.C., "Preparation of inner salt polymers from vinylimidazolium sulphobetaines," Polymer, vol. 18, p. 1058. (1977).

Salamone, J.C., "Aqueous solution properties of a poly(vinyl imidazolium sulphobetaine)," Polymer, vol. 19, p. 1157. (1978).

Wang, Yanfeng, "Syntheses and Properties of a Series of Amphiphilic Polyacrylamides Bearing Two Long Alkyl Chains and Phosphatidylcholine Analagous Groups in the Side Chains," Journal of Polymer Science, vol. 34, pp. 449–460. (1996).

* cited by examiner

*Primary Examiner*—David W. Wu
*Assistant Examiner*—Tanya Zalukaeva
(74) *Attorney, Agent, or Firm*—Michael B. Martin; Thomas M. Breininger

(57) ABSTRACT

This invention is directed to high molecular weight water-soluble zwitterionic polymers derived from zwitterionic and nonionic monomer units, and to the use of the polymers in papermaking processes.

14 Claims, 1 Drawing Sheet

HIGH MOLECULAR WEIGHT ZWITTERIONIC POLYMERS

TECHNICAL FIELD

This invention is directed to high molecular weight water-soluble zwitterionic polymers derived from zwitterionic and nonionic monomer units, and to the use of the polymers in papermaking processes.

BACKGROUND OF THE INVENTION

In many industrial operations such as papermaking or mining, or in many wastewater treatment applications such as sludge dewatering, the flocculation of an aqueous suspension is necessary or desirable. Polymers derived from acrylamide and cationic or anionic monomers such as N,N-dimethylaminoethyl acrylate methyl chloride quaternary salt or acrylic acid, respectively, are widely used to improve the flocculation performance parameters in these operations. Examples of performance parameters often measured are first pass retention (papermaking), settling rates (mining), and turbidity reduction (sludge dewatering). Terpolymers of acrylamide containing both cationic and anionic charge within the same polymer are termed poly(ampholytes) and have also been applied extensively in these systems. Such poly(ampholytes) are prepared by polymerizing acrylamide with a monomer containing a cationic group and another monomer containing an anionic group. Amphoteric water-in-oil self-inverting polymer emulsions and their use in papermaking are disclosed in U.S. Pat. Nos. 4,330,450, 4,363,886 and 4,392,917.

All of the flocculant chemistries described above possess a net ionic charge within a polymer chain either universally (as with copolymers when a comonomer has a net charge) or locally (as with polyampholytes). In the case of amphoteric terpolymers, the differences in monomer incorporation rates along with statistical variability creates non-homogeneous local charge distributions, giving rise to a net cationic or net anionic charge for a given polymer chain. The net charge within a given polymer segment is important, because any local positive or negative charge will be attracted to surfaces of opposite charge. Polymer segments containing a net charge will collapse or become less soluble at higher ionic strengths due to a reduction in electrostatic repulsion. Such a reduction in polymer solubility dramatically reduces the effectiveness of flocculation. For example, in papermaking systems, cationic flocculants are often used to bind to anionic filler and fiber surfaces. Similarly, cationic flocculants can bind effectively to anionic clay surfaces in mining applications.

In many process waters, there may be anionic substances that compete with the target anionic materials to be flocculated. When the target filler and fiber surfaces must compete for polymer with anionic solutes or colloids (anionic "trash"), the flocculation efficiency is dramatically decreased because of the reduction in available cationic sites within the polymer. To circumvent this problem, one has traditionally "titrated" the detrimental anionic substances using a cationic coagulant. When the coagulant neutralizes the anionic charge on the high surface area of the detrimental anionic substances, the flocculant then remains "free" to aggregate the remaining anionic fiber and filler surfaces, which is the desired result. However, fluctuations in charge demand of the process water owing to varying levels of the soluble detrimental anionic substances means that the coagulant dose will have to change in order to achieve the same extent of neutralization. Although eliminating the variations in flocculation performance is critical to maintaining process control and consistent operation, maintaining a constant solution charge prior to flocculent addition can be quite difficult in practice. An alternative approach to charge neutralization using coagulant addition is adding a flocculant which, by design, is resistant to changes in anionic trash levels and concentrations of charged species in solution.

One example of a flocculant more resistant to anionic trash is poly(acrylamide), which is a neutral, uncharged homopolymer. One can also manufacture a polymer which, rigorously, is overall electrically neutral but which contains both cationic and anionic functionality by incorporating a zwitterionic monomer.

Zwitterionic monomers and polymers have been widely studied, and their unique properties in aqueous solution have been well documented. For example, zwitterionic sulfobetaine monomers such as 1-(3-sulfopropyl)-2-vinylpyridinium betaine are commercially available. Vinylpyridinium carboxybetaine monomers are disclosed in *J. Poly. Sci.*, 1957, 26, 251. Zwitterionic monomers based on phosphorous such as 2-methyacryloyloxyethyl phosphorylcholine and 2-[3-acrylamidopropyl)dimethyl ammonio] ethyl 2'-isopropyl phosphate are disclosed in *Polymer Journal*, 1990, 22(5), 355–360 and *Polymer Science: Part A: Polymer Chemistry*, 1996, 34, 449–460, respectively. Vinylimidazolium sulfobetaines and their polymers are disclosed in *Polymer*, 1977, 18, 1058, and *Polymer*, 1978, 19, 1157. Carboxybetaines based on sulfonium acrylate monomers are disclosed in U.S. Pat. Nos. 3,269,991 and 3,278,501. Diallyl sulfobetaine monomers and polymers are disclosed in U.S. Pat. Nos. 4,822,847 and 5,788,866. A copolymer of acrylamide and 3-(2-acrylamido-2-methylpropanedimethylamino)-1-propanesulfonate is disclosed in McCormick, et al., *Polymer*, 1992, 33, 4617. However, in McCormick the polymers are prepared as homogeneous solutions in water, and polymerization is stopped at low conversion of monomer owing to unmanageable viscosities. Flocculation/coagulation studies using zwitterionic homopolymers of much lower molecular weights have been reported in *Polymer Prep.*, 1991, 32, 323 and *Environmental Technology*, 1998, 19, 323.

SUMMARY OF THE INVENTION

We have discovered that high molecular weight polymers made from one or more nonionic monomers and various zwitterionic monomers are uniquely suited for flocculating aqueous suspensions containing high conductivities or high levels of anionic or cationic components. These zwitterionic or inner-salt copolymers do not collapse in high concentrations of salt solution or in the presence of interfering polyanions or anionic colloids.

Accordingly, in its principle aspect, this invention is directed to a high molecular weight water-soluble zwitterionic polymer comprising from about 50 to about 99.9 mole percent of one or more nonionic monomers and from about 0.1 to about 50 mole percent of a zwitterionic monomer of formula

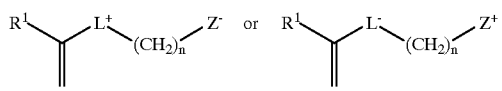

wherein $L^+$ is a group of formula

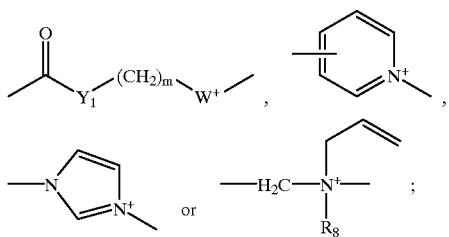

$L^-$ is a group of formula

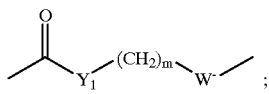

$R_1$ and $R_8$ are independently hydrogen or methyl;
$R_2$, $R_3$, $R_4$, $R_5$, $R_6$ and $R_7$ are independently selected from hydrogen and $C_1$–$C_4$ alkyl;
$Y_1$ and $Y_2$ are independently selected from O or $NR_2$;
$W^+$ is —$S^+R_3$— or —$N^+R_2R_3$—;

$W^-$ is $Z^-$ is $CO_2^-$, $SO_3^-$,

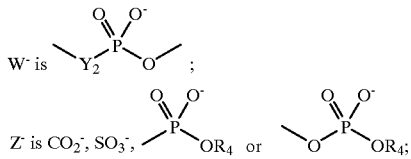

$Z^+$ is —$N^+R_5R_6R_7$;
m is 2 or 3; and
n is 1–5.

DETAILED DESCRIPTION OF THE INVENTION

Figure 1:
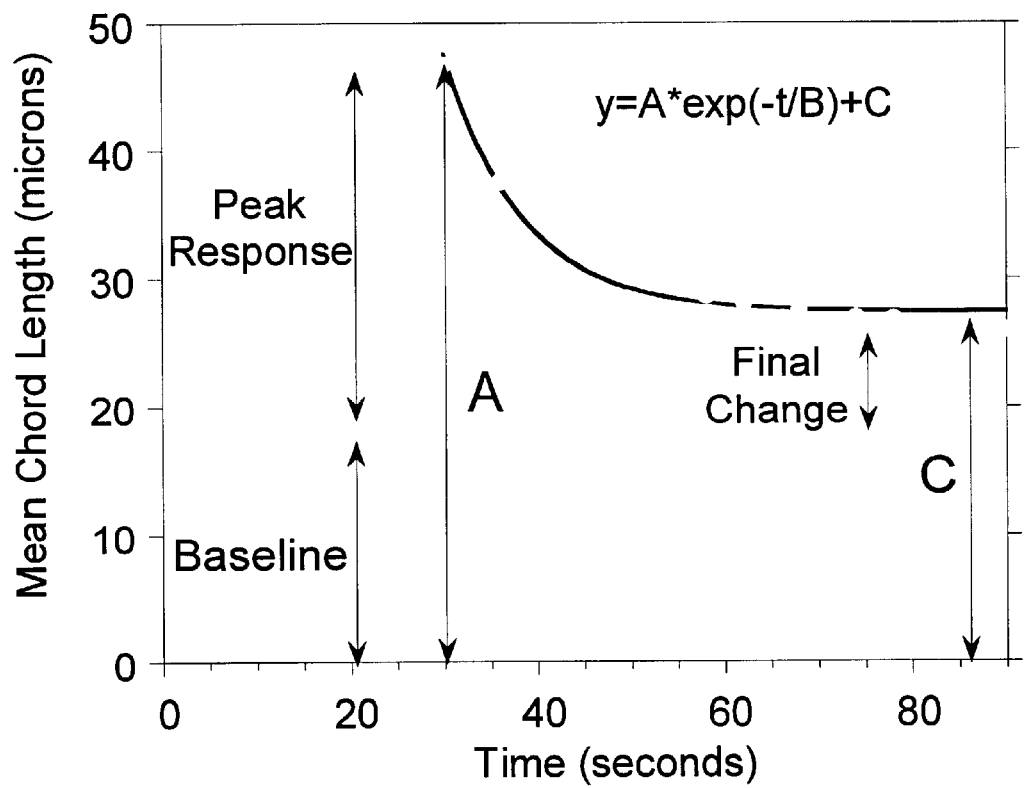
FIG. 1 is a plot of mean chord length in microns vs time in seconds which illustrates the changes in particle size distributions after adding a flocculant to a paper furnish. A scanning laser microscope is used as a flocculation analyzer. The method is described in the article "Characterization of the flocculation dynamics in a papermaking system by non-imaging reflectance scanning laser microscopy" (Nordic Pulp and Paper Research Journal 13(2), 159–165, 1998). Flocculant addition to a mechanically stirred furnish induces an increase in the mean chord length to some peak response value. The flocs that form are then sheared apart under the mixing conditions, resulting in a decrease in the mean chord length after the peak. The data starting from the peak response is fit to a single exponential as shown in FIG. 1. The fitting parameters A, B, and C are used empirically to differentiate the flocculation activity of the additives. The following values are reported in tables for each example:
Peak Response=(A+C)—Baseline
Decay Rate=B
Final Change=C—Baseline
A larger peak response means a larger initial aggregation process. A larger final change value means the flocs are more shear resistant under the mixing intensity used. The decay time is a relative estimate of the time to required to achieve a stable floc size. A smaller decay time means the flocs have reached their final size more quickly.

As used herein, the following abbreviations and terms shall have the following meanings:
AcAm for acrylamide;
DADMAC for diallyldimethylammonium chloride;
DMAEA for dimethylaminoethyl acrylate;
DMAEA.BCQ for dimethylaminoethyl acrylate.benzyl chloride quaternary salt;
DMAEA.MCQ for dimethylaminoethyl acrylate.methyl chloride quaternary salt;
DMAPMA for dimethylaminopropylmethacrylamide;
cP for centipoise;
AIVN for 2,2'-azobis(2,4-dimethylvaleronitrile);
AIBN for 2,2'-azobis(2-methylpropionitrile);
Na AMPS for the sodium salt of 2-acrylamido-2-methylpropane sulfonic acid;
VA-044 for 2,2'-azobis[2-(2-imidazolin-2-yl)propane] dihydrochloride;
V-501 for 4,4'-azobis(4-cyanopentanoic acid);
Versenex 80 for the pentasodium salt of diethylenetriaminepentaacetic acid.

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like. A preferred alkyl group is methyl.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_0}\right) - 1\right]}{c}$$

wherein
$\eta$=viscosity of polymer solution;
$\eta_o$=viscosity of solvent at the same temperature; and
c=concentration of polymer in solution.
As used herein, the units of concentration "c" are (grams/100 ml or g/deciliter). Therefore, the units of RSV are dl/g. The RSV is measured at 30° C. The viscosities $\eta$ and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

IV stands for intrinsic viscosity, which is RSV in the limit of infinite polymer dilution (i.e. the polymer concentration is equal to zero). The IV, as used herein, is obtained from the y-intercept of the plot of RSV versus polymer concentration in the range of 0.015–0.045 wt % polymer.

"Huggins Coefficient" means the slope obtained from plotting the reduced specific viscosity (RSV) versus polymer concentration in the range of 0.015–0.045 wt % polymer. In general, a Huggins coefficient greater than one indicates a more three-dimensional polymer conformation in solution which occurs, for example, when a cationic polymer is complexed with anionic substances such as PGA.

"Poly(galacturonic acid) (PGA)" is an anionically charged substance used as a model to mimic soluble anionic species which may be present in various paper furnishes. These anionic substances interfere with the performance of conventional cationic flocculants by complexation.

"Amphoteric" means a molecule containing both cationic and anionic substituents, although not necessarily in the same proportions.

"Zwitterionic" means a molecule containing cationic and anionic substituents in equal proportions, so that the molecule is net neutral overall.

"Monomer" means a polymerizable allylic, vinylic or acrylic compound. The monomer may be anionic, cationic or nonionic. Vinyl monomers are preferred, acrylic monomers are more preferred.

"Cationic Monomer" means a monomer as defined herein which possesses a net positive charge. Representative cationic monomers include the quaternary or acid salts of dialkylaminoalkyl acrylates and methacrylates, the quaternary or acid salts of dialkylaminoalkylacrylamides and methacrylamides, N,N-diallyldialkyl ammonium halides, Mannich products, and the like. Alkyl groups are generally $C_{1-4}$ alkyl. Representative cationic monomers include N,N-dimethylaminoethylacrylate methyl chloride quaternary salt (DMAEA.MCQ), diallyldimethylammonium chloride (DADMAC), and the like.

"Anionic monomer" means a monomer as defined herein which possesses a net negative charge. Representative anionic monomers include metal salts of acrylic acid, methacrylic acid, or itaconic acid, 2-acrylamido-2-methyl propane sulfonate, sulfopropyl acrylate or methacrylate or other water-soluble forms of these or other polymerizable carboxylic or sulphonic acids, sulphomethylated acrylamide, allyl sulphonate, sodium vinyl sulphonate, and the like.

"Nonionic monomer" means a monomer as defined herein which is electrically neutral. Representative nonionic monomers include acrylamide, methacrylamide, N-methylacrylamide, N,N-dimethyl(meth)acrylamide, N-isopropyl(meth)acrylamide, N-(2-hydroxypropyl) methacrylamide, N-methylolacrylamide, N-vinylformamide, N-vinylacetamide, N-vinyl-N-methylacetamide, poly(ethylene glycol)(meth)acrylate, poly (ethylene glycol)monomethyl ether mono(meth)acrylate, N-vinyl-2-pyrrolidone, glycerol mono((meth)acrylate), 2-hydroxyethyl(meth)acrylate, vinyl methylsulfone, vinyl acetate, and the like. Preferred nonionic monomers include acrylamide and methacrylamide. Acrylamide is more preferred.

"Zwitterionic monomer" means a polymerizable molecule containing cationic and anionic (charged) functionality in equal proportions, so that the molecule is net neutral overall.

Representative zwitterionic monomers include
N,N-dimethyl-N-acryloyloxyethyl-N-(3-sulfopropyl)-ammonium betaine,
N,N-dimethyl-N-acrylamidopropyl-N-(2-carboxymethyl)-ammonium betaine,
N,N-dimethyl-N-acrylamidopropyl-N-(3-sulfopropyl)-ammonium betaine,
N,N-dimethyl-N-acrylamidopropyl-N-(2-carboxymethyl)-ammonium betaine,
2-(methylthio)ethyl methacryloyl-S-(sulfopropyl)-sulfonium betaine,
2-[(2-acryloylethyl)dimethylammonio]ethyl 2-methyl phosphate,
2-(acryloyloxyethyl)-2'-(trimethylammonium)ethyl phosphate,
[(2-acryloylethyl)dimethylammonio]methyl phosphonic acid,
2-methacryloyloxyethyl phosphorylcholine (MPC),
2-[(3-acrylamidopropyl)dimethylammonio]ethyl 2'-isopropyl phosphate (AAPI),
1-vinyl-3-(3-sulfopropyl)imidazolium hydroxide,
(2-acryloxyethyl)carboxymethyl methylsulfonium chloride,
1-(3-sulfopropyl)-2-vinylpyridinium betaine,
N-(4-sulfobutyl)-N-methyl-N,N-diallylamine ammonium betaine (MDABS),
N,N-diallyl-N-methyl-N-(2-sulfoethyl)ammonium betaine, and the like.

"Polyampholyte" means a polyelectrolyte derived from both cationic monomers and anionic monomers, and, possibly, other non-ionic monomer(s). Representative polyampholytes include a copolymer composed of acrylic acid and DMAEA.MCQ (N,N-dimethylaminoethylacrylate, methyl chloride quaternary salt), a terpolymer composed of acrylic acid, DADMAC (diallyldimethylamonium chloride) and acrylamide, and the like. Due to the statistical distribution and different rates of monomer incorporation during polymerization, individual polymer chains and/or segments within those chains can have an excess of cationic or anionic charge. Thus, although one may polymerize cationic and anionic monomers in equal molar proportions, this does not ensure that electrically neutral polymer chains (or segments within those chains) are formed.

"Zwitterionic polymer" means a polymer composed from zwitterionic monomers and, possibly, other non-ionic monomer(s). Representative zwitterionic polymers include homopolymers such as the homopolymer of N,N-dimethyl-N-(2-acryloyloxyethyl)-N-(3-sulfopropyl)ammonium betaine, copolymers such as the copolymer of acrylamide and N,N-dimethyl-N-(2-acryloyloxyethyl)-N-(3-sulfopropyl)ammonium betaine, and terpolymers such as the terpolymer of acrylamide, N-vinyl-2-pyrrolidone, and 1-(3-sulfopropyl)-2-vinylpyridinium betaine. In zwitterionic polymers, all the polymer chains and segments within those chains are rigorously electrically neutral. Therefore, zwitterionic polymers represent a subset of polyampholytes, necessarily maintaining charge neutrality across all polymer chains and segments because both anionic charge and cationic charge are introduced within the same zwitterionic monomer.

"High molecular weight zwitterionic polymer" means a zwitterionic polymer as defined herein having an RSV of greater than 5 dL/g when measured at 450 ppm in 1M $NaNO_3$ as described herein. Preferred high molecular weight zwitterionic polymers have a RSV of greater than 15 dL/g. More preferred high molecular weight zwitterionic polymers have a RSV of greater than 25 dL/g.

The zwitterionic monomers used for preparing the water-soluble polymers of this invention are prepared as shown in Schemes 1 and 2. In Schemes 1 and 2, $R_1$, $R_2$, $R_3$, $R_4$, Y, m and n are as defined herein, and p is 1 or 2.

Scheme 1

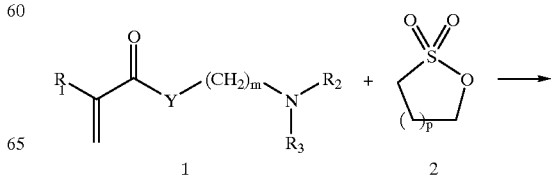

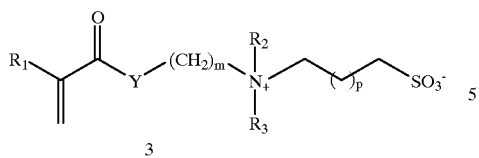

As shown in the foregoing Scheme 1, reaction of amine 1 with sultone 2, both available from Aldrich Chemical Co., Milwaukee, Wis., results in formation of the zwitterionic monomer 3. The reaction is conducted in a suitable organic solvent at a temperature of from about 25° C. to about 60° C. over about 6 to about 36 hours. Representative organic solvents include acetone, tetrahydrofuran, dioxane, ethyl acetate, and the like. The reaction is preferably conducted in acetone at about 30° C. to about 50° C. over 12–24 hours.

Scheme 2

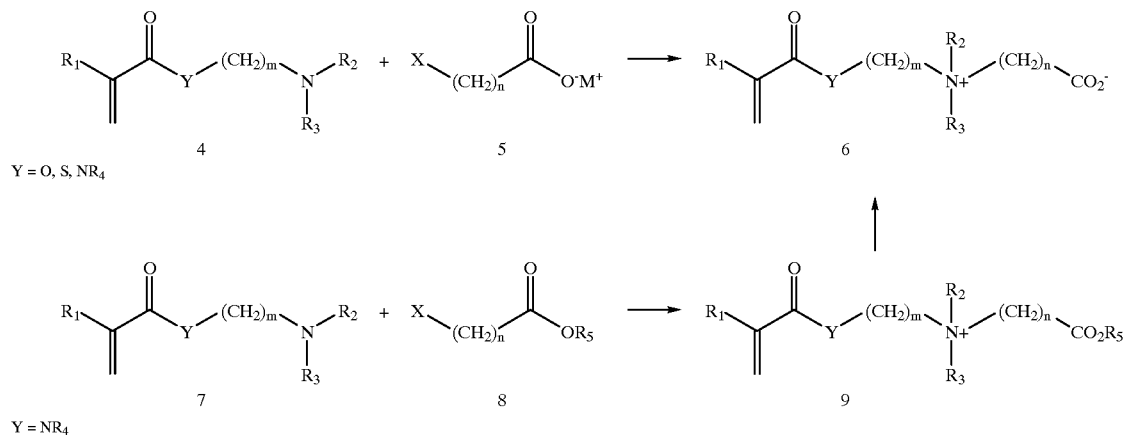

Y = O, S, NR$_4$

Y = NR$_4$

As shown in the foregoing Scheme 2, reaction of the amine 4 with the alkyl carboxylate 5 results in formation of the zwitterionic monomer 6. In Scheme 2, X represents any leaving group which may be displaced by the nucleophilic nitrogen atom of amines 4 and 7 under the conditions described herein. Representative leaving groups include halogen, tosylate, mesylate, and the like. A preferred leaving group is chloro. The reaction is conducted in water or in a mixture of water and a water-soluble organic solvent such that the acetate salt is soluble at a temperature of from about 25° C. to about 60° C. over about 6 to about 36 hours. Representative organic solvents include acetone, tetrahydrofuran, dioxane, and the like. The reaction is preferably conducted in water at about 30° C. to about 50° C. over 12–24 hours. Alternatively, as also shown in Scheme 2, the amine 7 may be allowed to react with an ester of the chloro- or bromomethylacetate, for example, in a suitable organic solvent to form a cationic intermediate, which can be isolated, purified, and subsequently hydrolyzed to the zwitterionic monomer under aqueous conditions.

Preferred high molecular weight water-soluble zwitterionic polymers of this invention are copolymers of acrylamide and the zwitterionic monomer of formula

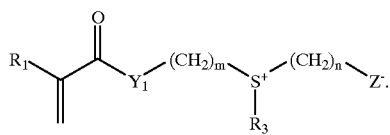

Other preferred high molecular weight water-soluble zwitterionic polymers of this invention are copolymers of acrylamide and a zwitterionic monomer of formula

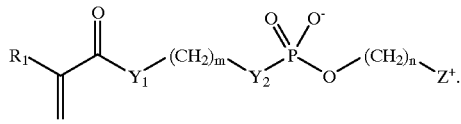

Other preferred high molecular weight water-soluble zwitterionic polymers of this invention are copolymers of acrylamide and a zwitterionic monomer of formula

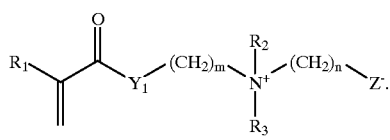

More preferred high molecular weight water-soluble zwitterionic polymers of this invention are copolymers of acrylamide and a zwitterionic monomer selected from
N,N-Dimethyl-N-acryloyloxyethyl-N-(3-sulfopropyl)-ammonium betaine,
N,N-Dimethyl-N-acrylamidopropyl-N-(2-carboxymethyl)-ammonium betaine,
N,N-Dimethyl-N-methacryloyloxyethyl-N-(3-sulfopropyl)-ammonium betaine,
N,N-Dimethyl-N-methacrylamidopropyl-N-(3-sulfopropyl)-ammonium betaine,
2-(methylthio)ethyl methacryloyl-S-(sulfopropyl)-sulfonium betaine,
2-[(2-acryloylethyl)dimethylammonio]ethyl 2-methyl phosphate, 2-(acryloyloxyethyl)-2'-(trimethylammonium)ethyl phosphate and

[(2-acryloylethyl)dimethylammonio]methyl phosphonic acid.

Still more preferred high molecular weight water-soluble zwitterionic polymers of this invention are copolymers of acrylamide and a zwitterionic monomer selected from N,N-Dimethyl-N-acryloyloxyethyl-N-(3-sulfopropyl)-ammonium betaine, N,N-Dimethyl-N-acrylamidopropyl-N-(2-carboxymethyl)-ammonium betaine, N,N-dimethyl-N-methacryloyloxyethyl-N-(3-sulfopropyl)-ammonium betaine and N,N-dimethyl-N-methacrylamidopropyl-N-(3-sulfopropyl)-ammonium betaine.

As discussed herein, the preparation of high molecular weight polymers and copolymers of acrylamide as homogeneous solutions in water is difficult because of the extremely high viscosities encountered. High solution viscosities are detrimental for a number of reasons, one being the loss of the ability to mix the reaction mixture and another being the loss of the ability to effectively remove heat from the reactor. Fortunately, two general methods exist which do allow for the production of high molecular weight acrylamide containing polymers and copolymers. The first method, which consists of polymerizing monomer(s) within a dispersed phase, is typified by inverse emulsion polymerization or dispersion polymerization. In the case of an inverse emulsion polymerization, the dispersed phase is formed prior to the polymerization, while in the case of a dispersion polymerization, the "dispersed" phase containing the polymer forms during the polymerization. The second method for preparing high molecular weight polymers and copolymers of acrylamide consists of conducting a gel polymerization to produce the polymer product as a dry powder.

"Inverse emulsion polymer" and "latex polymer" mean an invertible water-in-oil polymer emulsion comprising a zwitterionic polymer according to this invention in the aqueous phase, a hydrocarbon oil for the oil phase, a water-in-oil emulsifying agent and, potentially, an inverting surfactant. Inverse emulsion polymers are hydrocarbon continuous with the water-soluble polymers dispersed as micron sized particles within the hydrocarbon matrix. The advantages of polymerizing water-soluble monomers as inverse emulsions include 1) low fluid viscosity can be maintained throughout the polymerization, permitting effective mixing and heat removal, 2) the products can be pumped, stored, and used easily since the products remain liquids, and 3) the polymer "actives" or "solids" level can be increased dramatically over simple solution polymers, which, for the high molecular weight flocculants, are limited to lower actives because of viscosity considerations. The inverse emulsion polymers are then "inverted" or activated for use by releasing the polymer from the particles using shear, dilution, and, generally, another surfactant, which may or may not be a component of the inverse emulsion.

Inverse emulsion polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

The oil phase comprises any inert hydrophobic liquid. Preferred hydrophobic liquids include aliphatic and aromatic hydrocarbon liquids including benzene, xylene, toluene, paraffin oil, mineral spirits, kerosene, naphtha, and the like. A paraffinic oil is preferred.

Free radical yielding initiators such as benzoyl peroxide, lauroyl peroxide, 2,2'-azobis (isobutyronitrile) (AIBN), 2,2'-azobis(2,4-dimethylvaleronitrile) (AIVN), potassium persulfate and the like are useful in polymerizing vinyl and acrylic monomers. 2,2'-azobis(isobutyronitrile) (AIBN) and 2,2'-azobis(2,4-dimethylvaleronitrile) (AIVN) are preferred. The initiator is utilized in amounts ranging between about 0.002 and about 0.2 percent by weight of the monomers, depending upon the solubility of the initiator.

Water-in-oil emulsifying agents useful for preparing the latex polymers of this invention include sorbitan esters of fatty acids, ethoxylated sorbitan esters of fatty acids, and the like or mixtures thereof. Preferred emulsifying agents include sorbitan monooleate, polyoxyethylene sorbitan monostearate, and the like. Additional details on these agents may be found in McCutcheon's *Detergents and Emulsifiers*, North American Edition, 1980. Any inverting surfactant or inverting surfactant mixture described in the prior art may be used. Representative inverting surfactants include ethoxylated nonylphenol, ethoxylated linear alcohols, and the like. Preferred inverting surfactants are ethoxylated linear alcohols.

The polymer is prepared by polymerizing the appropriate monomers at from about 30° C. to about 85° C. over about 1 to about 24 hours, preferably at a temperature of from about 40° C. to about 70° C. over about 3 to about 6 hours.

The latex polymers of this invention contain from about 0.1 to about 50 mole % zwitterionic monomers. Preferred latex polymers of this invention contain from about 0.3 to about 10 mole % zwitterionic monomers. More preferred latex polymers of this invention contain from about 0.5 to about 10 mole % zwitterionic monomers.

"Dispersion" polymers mean a water-soluble polymer dispersed in an aqueous continuous phase containing one or more inorganic salts. Representative examples of dispersion polymerization of water-soluble polymers in an aqueous continuous phase can be found in the following references: Takeda, H.; Kawano, C. U.S. Pat. No. 4,929,655, 1990; Takeda, H.; Kawano, C. U.S. Pat. No. 5,006,590, 1991; Hurlock, J. R.; Ramesh, M. U.S. Pat. No. 5,597,859, 1997; Werges, D. L., Ramesh, M. Eur. Patent 657,478, 1996; Ramesh, M., Cramm, J. R., Werges, D. L., Howland, C. P. U.S. Pat. No. 5,597,858, 1997; Ramesh, M., Howland, C. P., Cramm, J. R. Eur. Patent 630,909, 1994.

Dispersion polymers are prepared by combining water, one or more inorganic salts, one or more water-soluble monomers, any polymerization additives such as chelants, pH buffers or chain transfer agents, and a water-soluble stabilizer polymer. This mixture is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen whilst maintaining temperature and mixing for several hours. During the course of the reaction, a discontinuous phase containing the water-soluble polymer is formed. After this time, the products are cooled to room temperature, and any post-polymerization additives are charged to the reactor. Water continuous dispersions of water-soluble polymers are free flowing liquids with product viscosities generally 100–10,000 cP, as measured at low shear. The advantages of preparing water-soluble polymers as water continuous dispersions are similar to those already mentioned in association with the inverse emulsion polymers. The water continuous dispersion polymers have the further advantages that they contain no hydrocarbon oil or surfactants, and require no surfactant for "inversion" or activation.

The dispersion polymers of this invention contain from about 0.1 to about 50 mole % zwitterionic monomers. Preferred dispersion polymers of this invention contain from about 0.3 to about 10 mole % zwitterionic monomers. More preferred dispersion polymers of this invention contain from about 0.5 to about 10 mole % zwitterionic monomers.

A "gel" polymerization is defined as a process for producing polymers as dry powders. The preparation of high molecular weight water-soluble polymers as dry powders using a gel polymerization is generally performed as follows: an aqueous solution of water-soluble monomers, generally 20–60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

The dry polymers of this invention contain from about 0.1 to about 50 mole % zwitterionic monomers. Preferred dry polymers of this invention contain from about 0.3 to about 10 mole % zwitterionic monomers. More preferred dry polymers of this invention contain from about 0.5 to about 10 mole % zwitterionic monomers.

The water-soluble zwitterionic polymers of this invention are useful as retention and drainage aids in the manufacture of paper and as a flocculent for removing suspended solids from white water in the papermaking process with particular importance for mechanical grades with high amounts of "anionic trash".

In the manufacture of paper, an aqueous cellulosic suspension or furnish is formed into a paper sheet. The slurry of cellulosic fiber is generally diluted to a consistency (percent dry weight of solids in the furnish) of about 4 weight percent of fiber or less, and generally around 1.5% or less, and often below 1.0% ahead of the paper machine, while the finished sheet typically has less than 7 weight percent water. Hence the dewatering and retention aspects of papermaking are extremely important to the efficiency and cost of the manufacture.

Gravity dewatering is a preferred method of drainage because of its relatively low cost. After gravity drainage more expensive methods are used for dewatering, for instance vacuum, pressing, felt blanket blotting and pressing, evaporation and the like. In actual practice a combination of such methods is employed to dewater, or dry, the sheet to the desired water content.

Another aspect of papermaking that is extremely important to the efficiency and cost is retention of furnish components on and within the fiber mat. The papermaking furnish represents a system containing significant amounts of small particles stabilized by colloidal forces. A papermaking furnish generally contains, in addition to cellulosic fibers, particles ranging in size from about 5 to about 1000 nm consisting of for example cellulosic fines, mineral fillers (employed to increase opacity, brightness and other paper characteristics) and other small particles that generally, without the inclusion of one or more retention aids, would in significant portion pass through the spaces (pores) between the mat formed by the cellulosic fibers on the papermachine.

Greater retention of fines, fillers, and other components of the furnish allows, for a given grade of paper, the papermaker to reduce the cellulosic fiber content of such paper, thus lowering the cost of production. As pulps of lower quality are employed to reduce papermaking costs, the retention aspect of papermaking becomes more important because the fines content of such lower quality pulps is generally greater. Greater retention also decreases the amount of such substances lost to the whitewater and hence reduces the amount of material wastes, the cost of waste disposal and the adverse environmental effects therefrom. It is generally desirable to reduce the amount of material employed in a papermaking process for a given purpose, without diminishing the result sought. Such add-on reductions may realize both a material cost savings and handling and processing benefits.

Other points in the papermaking process where material savings are important include pulp washers or thickeners. These processes filter the pulp with the purpose of displacing unwanted soluble or colloidal materials out of the pulp suspension, or thickening the pulp for a subsequent processing step. Valuable filler or cellulose fines can be lost during either thickening or washing processes. The addition of treatment additives, such as coagulants or flocculants, can be beneficial to the efficiency of these processes.

Various chemical additives have been utilized in an attempt to increase the rate at which water drains from the formed sheet, and to increase the amount of fines and filler retained on the sheet. The use of high molecular weight water-soluble polymers is a significant improvement in the manufacture of paper. These high molecular weight polymers act as flocculants, forming large flocs which deposit on the sheet. They also aid in the dewatering of the sheet. In order to be effective, conventional single and dual polymer retention and drainage programs require incorporation of a higher molecular weight component as part of the program. In these conventional programs, the high molecular weight component is added after a high shear point in the stock flow system leading up to the headbox of the paper machine. This is necessary since flocs are formed primarily by the bridging mechanism and their breakdown is a largely irreversible process. For this reason, most of the retention and drainage performance of a flocculant is lost by feeding it before a high shear point. One alternative, prefiller flocculation, is a common application where a flocculant is added directly to a filler slurry prior to its introduction into the paper furnish designed to increase filler retention (*Paper Technology and Industry,* 1985, p. 129).

While successful, high molecular weight flocculant programs are improved by the addition of so called inorganic "microparticles". One such program employed to provide an improved combination of retention and dewatering is described in U.S. Pat. Nos. 4,753,710 and 4,913,775 incorporated herein by reference, in which a high molecular weight linear cationic polymer is added to the aqueous cellulosic papermaking suspension before shear is applied to the suspension, followed by the addition of bentonite after the shear application. Shearing is generally provided by one or more of the cleaning, mixing and pumping stages of the papermaking process, and the shear breaks down the large flocs formed by the high molecular weight polymer into microflocs. Further agglomeration then ensues with the addition of the bentonite clay particles.

Although, as described above, the microparticle is typically added to the furnish after the flocculant and after at least one shear zone, the microparticle effect can also be observed if the microparticle is added before the flocculant and the shear zone (U.S. Pat. No. 4,305,781). Another program where an additive is injected prior to the flocculant is the so-called "enhancer/flocculant" treatment. Enhancer programs are comprised of the addition of an enhancer, such as phenolformaldehyde resin, to the furnish, followed by addition of a high molecular weight, nonionic flocculant such as polyethylene oxide (U.S. Pat. No. 4,070,236). In such systems, the enhancer improves the performance of the flocculant.

In a single polymer/microparticle retention and drainage aid program, a flocculant, typically a cationic polymer, is the only polymer material added along with the microparticle. Another method of improving the flocculation of cellulosic fines, mineral fillers and other furnish components on the fiber mat using a microparticle is in combination with a dual polymer program which uses, in addition to the microparticle, a coagulant and flocculent system. In such a system a coagulant is first added, for instance a low molecular weight synthetic cationic polymer or cationic starch. The coagulant may also be an inorganic coagulant such as alum or polyaluminum chlorides. This addition can take place at one or several points within the furnish make up system, including but not limited to the thick stock, white water system, or thin stock of a machine. This coagulant generally reduces the negative surface charges present on the particles in the furnish, such as cellulosic fines and mineral fillers, and thereby accomplishes a degree of agglomeration of such particles. However, in the presence of other detrimental anionic species, the coagulant serves to neutralize the interfering species enabling aggregation with the subsequent addition of a flocculant. Such a flocculant generally is a high molecular weight synthetic polymer which bridges the particles and/or agglomerates, from one surface to another, binding the particles into larger agglomerates. The presence of such large agglomerates in the furnish, as the fiber mat of the paper sheet is being formed, increases retention. The agglomerates are filtered out of the water onto the fiber web, whereas unagglomerated particles would, to a great extent, pass through such a paper web. In such a program the order of addition of the microparticle and flocculant can be reversed successfully.

Mechanical pulping often produces paper furnishes which can be problematic to flocculate. In mechanical pulps, approximately 1–5% of the wood is transformed into soluble components contained in the process water. Due to inefficient washing of mechanical pulps (particularly bleached pulps), the dissolved and colloidal substances (DCS) are transferred to the paper machine where they can interfere with papermaking. The DCS is often anionically charged and is often referred to as anionic trash. The presence of DCS can dramatically effect the flocculation and drainage performance of additives described above which are designed to improve such processes. In highly closed systems, DCS may accumulate to high concentrations that are detrimental to optimum machine operation and/or product quality. Furthermore, fluctuations in bleaching levels can cause variations in DCS concentrations. DCS variability creates poor process control over the retention and drainage performance when additive effectiveness is DCS dependent.

Thus, pulps with high and/or varying DCS levels (or high conductivities) or specific charged species detrimental to traditional flocculants require more specialized flocculants to maintain effective/efficient retention and drainage performance.

Accordingly, in another aspect, this invention is directed to a method for increasing retention in fibrous suspensions of pulp during processing of said pulp comprising adding to the pulp an effective flocculating amount of the water-soluble zwitterionic latex polymer of claim 1.

In an improved aspect of the foregoing, bentonite is added to the pulp as a representative microparticle. Phenol-formaldehyde resin may also be added to improve the flocculating activity of electrically neutral or near-neutral flocculants.

In another aspect, this invention is directed to a method of improving the efficiency of drainage of water from a papermaking furnish comprising adding an effective amount of the water-soluble zwitterionic polymer of claim 1 to the furnish.

In an improved aspect of the foregoing, a coagulant is added to the pulp.

In another aspect, this invention is directed to a method of removing suspended solids from white water in the papermaking process comprising adding to the white water an effective flocculating amount of the water-soluble zwitterionic polymer of claim 1.

The foregoing may be better understood by reference to the following examples which are presented for purposes of illustration and are not intended to limit the scope of this invention. The following abbreviations are used in the examples below:

PAM: polyacrylamide homopolymer (Nalco Chemical Company, Naperville, Ill.);

1-CPAM: 1 mole % DMAEA.MCQ-acrylamide copolymer (Nalco Chemical Company, Naperville, Ill.);

X-ZPAM: X mole % zwitterionic monomer, (100-X) mole % acrylamide copolymer;

1,1-APAM: 1 mole % DMAEA.MCQ, 1 mole % anionic monomer, 98 mole % acrylamide terpolymer.

EXAMPLE 1

Monomer A, N,N-Dimethyl-N-acryloyloxyethyl-N-(3-sulfopropyl)-ammonium Betaine 10 g of N,N-dimethylaminoethyl acrylate (CPS Chemical Company, Old Bridge, N.J.) is dissolved in approximately 150 mL of acetone in a 250 mL round bottom flask containing a magnetic stir bar. To this solution is added 8.35 g of propane sultone (Aldrich). The flask is equipped with a reflux condenser and heated at 30° C. with stirring overnight. In the morning, the resulting white solid is isolated by filtration, washed twice with diethyl ether, and dried under vacuum in a desiccator for 24 hours. A $^{13}$C NMR spectrum of the product is consistent with the structure of the sulfobetaine monomer.

EXAMPLE 2

Monomer B, N,N-Dimethyl-N-acrylamidopropyl-N-(2-carboxymethyl)-ammonium Betaine 20 g of N,N-dimethylaminopropylacrylamide (Kohjin, Co., Ltd., Tokyo, Japan) is dissolved in approximately 150 mL of acetone in a 250 mL round bottom flask containing a magnetic stir bar. To this solution is added 13.90 g of methyl chloroacetate (Aldrich). The flask is equipped with a reflux condenser and heated at 30° C. with stirring overnight. In the morning, the resulting white solid is isolated by filtration, washed twice with diethyl ether, and dried in vacuo to remove all traces of the solvent. The zwitterionic monomer is generated in situ by raising the pH of a 10% aqueous solution of the reaction product, dimethylaminopropylacrylamide methylchloroacetate quaternary salt, to around 10.0 for several hours. After the hydrolysis of the methyl ester is finished, the pH of the aqueous solution now containing the zwitterionic monomer is lowered to 4.0 using concentrated hydrochloric acid, and the solution of monomer is used as is in subsequent polymerizations.

EXAMPLE 3

Monomer C, 2-(methylthio)ethyl methacryloyl-S-(sulfopropyl)-sulfonium Betaine 15 g of 2-(methylthio)ethyl methacrylate (Aldrich Chemical Co., Milwaukee, Wis.) is dissolved in 20 mL of acetone in a 100 mL round bottom flask containing a magnetic stir bar. To this solution is added 12.6 g of propane sultone (Aldrich) and 0.06 g (Aldrich) of hydroquinone. The flask is equipped with a reflux condenser and heated at 50° C. with stirring overnight. In the morning, the resulting white solid is isolated by filtration, washed twice with diethyl ether, and dried in vacuo for 24 hours. The $^1H$ and $^{13}C$ NMR spectra of the product are consistent with the structure of the sulfobetaine monomer.

EXAMPLE 4

Monomer D, 2-[(2-acryloylethyl)dimethylammonio]ethyl 2-methyl Phosphate 9.66 grams of 2-methoxy-1,3,2-dioxaphospholane (prepared according to the procedure of Wang, et al, in J. Polymer Science: Part A: Polymer Chemistry, Vol 34, 449–460, 1996) and 10.54 g of N,N-dimethylaminoethyl acrylate (CPS Chemical Company, Old Bridge, N.J.) is dissolved in 40 mL of anhydrous acetonitrile in a pressure tube containing a magnetic stir bar and 15 ppm of phenothiazine. The pressure tube is sealed and the reaction is heated at 60° C. for 18 hours. The solvent is removed in vacuo and the residue is dissolved in methanol. The methanol solution is then added to 200 mL of tetrahydrofuran, from which a slightly yellow powder precipitated. The yellow precipitate is collected by filtration and dried. The product is freely water-soluble. The $^{13}C$ and $^1H$ NMR spectra of the product are consistent with the structure of the phosphobetaine monomer.

EXAMPLE 5

Monomer E, 2-(acryloyloxyethyl)-2'-(trimethylammonium)ethyl Phosphate 5 grams of of 2-chloro-1,3,2-dioxaphospholane (available from Aldrich Chemical Company, Milwaukee, Wis.) is dissolved in 10 mL of anhydrous tetrahydrofuran and added dropwise to a solution of 4.1 g of 2-hydroxyethylacrylate (Aldrich Chemical Company, Milwaukee, Wis.) containing 3.54 g of triethylamine in anhydrous tetrahydrofuran at −20° C. The solution is allowed to warm to room temperature with stirring over 3 hours. Filtration and removal of the solvent yielded a viscous yellow liquid. The liquid is essentially pure 2-(acryloyloxyethyl)-1,3,2-dioxaphospholane-2-oxide as determined by $^1H$ and $^{13}C$ NMR.

7.9 g of the 2-(acryloyloxyethyl)-1,3,2-dioxaphospholane-2-oxide is dissolved in 30 mL of anhydrous acetonitrile and placed in a 100 mL pressure tube with a stir bar. To this solution is added 4.1 g of anhydrous trimethylamine. The pressure tube is capped and heated at 60° C. for 18 hours, during which time a white solid formed. The solid is isolated and identified as the zwitterionic phosphorylcholine by $^1H$ and $^{13}C$ NMR analysis.

EXAMPLE 6

Monomer F, [(2-acryloylethyl)dimethylammonio]methyl phosphonic Acid 10.975 grams of N,N-dimethylaminoethylacrylate (CPS Chemical Company, Old Bridge, N.J.) is added to a solution of 13.36 g of chloromethylphosphonic acid disodium salt. (Hoechst Aktiengesellschaft, Frankfurt, Germany) in 50 mL of deionized water. The solution is heated at 60° C. for 24 hours, and then cooled to room temperature. $^1H$ and $^{13}C$ NMR analysis of the resulting solution indicated essentially quantitative synthesis of the zwitterionic monomer.

EXAMPLE 7

Water-in-oil Emulsion Polymer Consisting of 1 Mole % Monomer A/99 Mole % Acrylamide (1-ZPAM)

An oil phase is prepared by heating 260 g of a paraffinic oil, 12 g of a sorbitan monooleate (ICI Americas, Inc. Wilmington, Del.), and 9.2 g of a polyoxyethylene sorbitan tristrearate (ICI Americas, Inc. Wilmington, Del.) until the surfactants dissolved.

An aqueous monomer phase is prepared by combining 527.16 g of acrylamide (50% solution), 131.5 g of deionized water, 9.94 g of Monomer A, 10 g of adipic acid, 40 g of sodium chloride, and 0.2 of ethylenediaminetetraacetic acid, terta sodium salt (Dow Chemical Co., Midland, Mich.).

The oil phase is charged to a 1.5L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.200 g of AIBN (2,2'azobis(isobutyrylnitrile), E. I. DuPont Nemours & Co., Inc., Wilmington, Del.) and 0.025 g of AIVN ((2,2'azobis(2,4-dimethylvaleronitrile), E. I. DuPont Nemours & Co., Inc., Wilmington, Del.) is added. The polymerization is conducted at 44° C. for four hours, and then at 70° C. for one hour. The polymer product has an Reduced Specific Viscosity (RSV) of 25.4 dL/g (450 ppm in 1M $NaNO_3$).

EXAMPLE 8

Water-in-oil Emulsion Polymer Consisting of 2 Mole % Monomer A/98 Mole % Acrylamide (2-ZPAM)

An oil phase is prepared by heating 260 g of a paraffinic oil, 12 g of a sorbitan monooleate (ICI Americas, Inc. Wilmington, Del.), and 9.2 g of a polyoxyethylene sorbitan tristrearate (ICI Americas, Inc. Wilmington, Del.) until the surfactants dissolved.

An aqueous monomer phase is prepared by combining 525.43 g of acrylamide (50% solution), 123.06 g of deionized water, 19.88 g of Monomer A, 10 g of adipic acid, 40 g of sodium chloride, and 0.2 of ethylenediaminetetraacetic acid, tetra sodium salt (Dow Chemical Co., Midland, Mich.).

The oil phase is charged to a 1.5 L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.200 g of AIBN (2,2'-azobis(isobutyrylnitrile), E. I. DuPont Nemours & Co., Inc., Wilmington, Del.) and 0.025 g of AIVN ((2,2'-azobis(2,4-dimethylvaleronitrile), E. I. DuPont Nemours & Co., Inc., Wilmington, Del.) is added. The polymerization is conducted at 44° C. for four hours, and then at 70° C. for one hour. The polymer product has a Reduced Specific Viscosity (RSV) of 30.5 dL/g (450 ppm in 1M $NaNO_3$).

EXAMPLE 9
Water-in-oil Emulsion Polymer Consisting of 5 Mole % Monomer A/95 Mole % Acrylamide (5-ZPAM)

An oil phase is prepared by heating 260 g of a paraffinic oil, 15 g of a sorbitan monooleate (ICI Americas, Inc. Wilmington, Del.), and 5 g of a polyoxyethylene sorbitan monostearate (ICI Americas, Inc. Wilmington, Del.) until the surfactants dissolved.

An aqueous monomer phase is prepared by combining 435.97 g of acrylamide (49.4% solution), 195.44 g of deionized water, 42.82 g of Monomer A, 15 g of adipic acid, 30 g of sodium chloride, and 0.2 of ethylenediaminetetraacetic acid, tetra sodium salt (Dow Chemical Co., Midland, Mich.).

The oil phase is charged to a 1.5 L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.250 g of AIBN (2,2'-azobis(isobutyrylnitrile), E. I. DuPont Nemours & Co., Inc., Wilmington, Del.) is added. The polymerization is conducted at 44° C. for four hours, and then at 70° C. for one hour. The polymer product has a Reduced Specific Viscosity (RSV) of 24.2 dL/g (450 ppm in 1M $NaNO_3$).

EXAMPLE 10
Water-in-oil Emulsion Polymer Consisting of 1 mole % Monomer B/99 mole % Acrylamide (1-ZPAM)

An oil phase is prepared by heating 260 g of a paraffinic oil, 12 g of a sorbitan monooleate (ICI Americas, Inc. Wilmington, Del.), and 9.2 g of a polyoxyethylene sorbitan tristrearate (ICI Americas, Inc. Wilmington, Del.) until the surfactants dissolved.

An aqueous monomer phase is prepared by hydrolyzing 11.77 g of the precursor to Monomer B in 115.37 g of deionized water as described in Example 2, and then combining this solution with 541.23 g of acrylamide (49.4% solution), 10 g of adipic acid, 40 g of sodium chloride, and 0.2 g of ethylenediaminetetraacetic acid, tetra sodium salt (Dow Chemical Co., Midland, Mich.).

The oil phase is charged to a 1.5L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.200 g of AIBN (2,2'azobis(isobutyrylnitrile), E. I. DuPont Nemours & Co., Inc., Wilmington, Del.) and 0.025 g of AIVN ((2,2'azobis(2,4-dimethylvaleronitrile), E. I. DuPont Nemours & Co., Inc., Wilmington, Del.) are added. The polymerization is conducted at 44° C. for four hours, and then at 70° C. for one hour. The polymer product has a Reduced Specific Viscosity (RSV) of 22.6 dL/g (450 ppm in 1M $NaNO_3$).

EXAMPLE 11
Water-in-oil Emulsion Polymer Consisting of 2 Mole % Monomer C/98 Mole % Acrylamide (2-ZPAM)

An oil phase is prepared by heating 18.2 g of a paraffinic oil, 12 g of a sorbitan monooleate (ICI Americas, Inc. Wilmington, Del.), and 9.2 g of a polyoxyethylene sorbitan tristearate (ICI Americas, Inc. Wilmington, Del.) until the surfactans dissolved.

An aqueous monomer phase is prepared by combining 37.66 g of acrylamide (50% solution), 7.68 g of deionized water, 1.45 g of Monomer C, 0.7 g of adipic acid, 2.8 g of sodium chloride, and 0.014 g of ethylenediaminetetraacetic acid, tetrasodium salt (Dow Chemical Co., Midland, Mich.).

The oil phase is charged to a 125 mL reactor equipped with a stir bar, a thermometer, and a nitrogen sparge tube. With vigorous stirring, the aqueous monomer phase is added to the oil phase to form a water-in-oil emulsion. This emulsion is heated to 44° C., and 0.014 g of AIBN (2,2'-azobis(isobutyrylnitrile), E. I. DuPont Nemours & Co., Inc., Wilmington, Del.) and 0.0018 g of AIVN (2,2'-azobis(2,4-dimethylvaleronitrile), E. I. DuPont Nemours & Co., Inc., Wilmington, Del.) is added. The polymerization is conducted at 44° C. for four hours and then at 70° C. for one hour. The product of the reaction is a low viscosity fluid.

EXAMPLE 12

A Water-in-oil Emulsion Polymer Consisting of 1 mole % DMAEA.MCQ/1 mole % Na AMPS/98 mole % acrylamide (1,1-APAM) is prepared for comparison to the water-in-oil emulsion polymers of this invention.

An oil phase is prepared by heating 260 g of a paraffinic oil, 12 g of a sorbitan monooleate (ICI Americas, Inc. Wilmington, Del.), and 9.2 g of a polyoxyethylene sorbitan tristearate (ICI Americas, Inc. Wilmington, Del.) until the surfactants dissolved.

An aqueous monomer phase is prepared by combining 527.16 g of acrylamide (50% solution), 8.70 g of DMAEA.MCQ (80% solution), 14.25 g of 2-acrylamido-2-methylpropanesulfonic acid, sodium salt (58% solution), 120 g of deionized water, 10 g of adipic acid, 40 g of sodium chloride and 0.20 g of ethylenediaminetetraacetic acid, tetrasodium salt (Dow Chemical Co., Midland, Mich.).

The oil phase is charged to a 1.5 L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.200 g of AIBN (2,2'azobis(isobutyrylnitrile), E. I. DuPont Nemours & Co., Inc., Wilmington, Del.) and 0.025 g of AIVN ((2,2'azobis(2,4-dimethylvaleronitrile), E. I. DuPont Nemours & Co., Inc., Wilmington, Del.) is added. The polymerization is conducted at 44° C. for four hours, and then at 70° C. for one hour. The polymer product has a Reduced Specific Viscosity (RSV) of 25.2 dL/g (450 ppm in 1M $NaNO_3$).

EXAMPLE 13

A water-in-oil emulsion polymer consisting of 1 mole % DMAEA.MCQ/1 mole % acrylic acid/98 mole % acrylamide (1,1-APAM) is prepared for comparison to the water-in-oil emulsion polymers of this invention.

An oil phase is prepared by heating 260 g of a paraffinic oil, 12 g of a sorbitan monooleate (ICI Americas, Inc. Wilmington, Del.), and 9.2 g of a polyoxyethylene sorbitan tristearate (ICI Americas, Inc. Wilmington, Del.) until the surfactants dissolved.

An aqueous monomer phase is prepared by combining 527.16 g of acrylamide (50% solution), 8.70 g of DMAEA.MCQ (80% solution), 2.58 g of acrylic acid, 124 g of deionized water, 10 g of adipic acid, 40 g of sodium chloride and 0.20 g of ethylenediaminetetraacetic acid, tetra sodium salt (Dow Chemical Co., Midland, Mich.).

The oil phase is charged to a 1.5L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.200 g of AIBN (2,2'-azobis(isobutyrylnitrile), E. I. DuPont Nemours & Co., Inc., Wilmington, Del.) and 0.025 g of AIVN ((2,2'-azobis(2,4-dimethylvaleronitrile), E. I. DuPont Nem-

EXAMPLE 14
Water Continuous Dispersion Polymer With a Composition of 1 Mole % Monomer A/99 Mole % Acrylamide 459.19 grams of deionized water, 292.13 g of acrylamide solution (50.1%), 5.93 g of monomer A, 80 g of ammonium sulfate, 120 g of sodium sulfate, 0.40 g of sodium formate, 0.25 g of ethylenediaminetetraacetic acid, tetra sodium salt (Dow Chemical Co., Midland, Mich.), and 40 g of a 15% solution of an acrylic acid/Na AMPS copolymer (molar ratio 77/23) are combined to form a homogenous solution. This solution is adjusted to a pH of 4.0 with 50% sodium hydroxide, and then charged to a 1.5L reactor equipped with a helical ribbon impeller, a thermocouple, a nitrogen purge tube and a water condenser. The contents of the reactor are agitated and heated to 36° C. 0.3 grams of a 2% solution of VA-044 (Wako Chemicals USA, Inc., Richmond, Va.) is added and the contents of the reactor are sparged with nitrogen. The reaction is continued for two hours under these conditions, and then 0.3 g of a 2% solution of VA-044 is added. The reaction is continued for an additional two hours, and then 0.3 g of a 2% solution of VA-044 is added, and the reaction is continued for another two hours. After this time, 1.2 g of a 2% solution of VA-044 is added and the reaction is continued overnight. The next morning, 20 g of sodium sulfate is added to the reactor, and after mixing for thirty minutes, the polymer dispersion is removed from the reactor and tranferred to storage. The product has a Brookfield viscosity of 1200 cP and a RSV of 14.0 dL/g (450 ppm in 1M $NaNO_3$).

EXAMPLE 15
Dry Polymer With a Composition of 1 Mole % N,N-dimethyl-N-methacryloyloxyethyl-N-(3-sulfopropyl)-ammonium Betaine/99 Mole % Acrylamide In a 600 mL insulated flask, 125.77 g of deionized water, 254 g of acrylamide solution (48.7%), 4.92 g of N,N-dimethyl-N-methacryloyloxyethyl-N-(3-sulfopropyl)-ammonium betaine (Aldrich Chemical Co., Milwaukee, Wis.), 0.190 g of sodium hydroxide solution (50%), and 0.43 g of acetic acid are combined. To this solution is added 5.0 g of a 4% solution of V-501 (Wako Chemicals USA, Inc., Richmond, Va.), 1.54 g of a 10% solution of Versenex 80 (Dow Chemical Co., Midland, Mich.), 2.8 g of a 0.10% solution of sodium hypophosphite, 4.8 g of a 0.125% solution of ammonium persulfate, and 2.0 g of a 0.2% solution of ferrous ammonium sulfate. The solution is purged with nitrogen, and within a few minutes the temperature of the solution began to rise. The temperature is allowed to increase adiabatically. The product is a rubbery gel which is shredded, dried, and ground to a fine powder. The polymer product has a RSV of 9 dL/g (450 ppm in 1M $NaNO_3$).

EXAMPLE 16
Water-in-oil Emulsion Polymer Consisting of 2 Mole % Monomer D/98 Mole % Acrylamide An oil phase is prepared by heating 18.2 g of a paraffinic oil, 0.84 g of a sorbitan monooleate (ICI Americas, Inc. Wilmington, Del.), and 0.65 g of a polyoxyethylene sorbitan tristearate (ICI Americas, Inc. Wilmington, Del.) until the surfactants dissolved.

An aqueous monomer phase is prepared by combining 36.43 g of acrylamide (49.6% solution), 4.13 g of deionized water, 6.24 g of a 23.4% solution of Monomer D, 0.7 g of adipic acid, 2.8 g of sodium chloride, and 0.014 g of ethylenediaminetetraacetic acid, tetra sodium salt (Dow Chemical Co., Midland, Mich.).

The oil phase is charged to a 125 mL reactor equipped with a stir bar, a thermometer, and a nitrogen sparge tube. With vigorous stirring, the aqueous monomer phase is added to the oil phase to form a water-in-oil emulsion. This emulsion is heated to 44° C., and 0.014 g of AIBN (2,2'-azobis(isobutyrylnitrile), E. I. DuPont Nemours & Co., Inc., Wilmington, Del.) and 0.0018 g of AIVN (2,2'-azobis(2,4-dimethylvaleronitrile), E. I. DuPont Nemours & Co., Inc., Wilmington, Del.) is added. The polymerization is conducted at 44° C. for four hours and then at 70° C. for one hour. The polymer product has a RSV of 9.5 dL/g (450 ppm in 1M $NaNO_3$).

EXAMPLE 17
Water-in-oil Emulsion Polymer Consisting of 2 mole % Monomer E/98 Mole % Acrylamide An oil phase is prepared by heating 18.2 g of a paraffinic oil, 0.84 g of a sorbitan monooleate (ICI Americas, Inc. Wilmington, Del.), and 0.65 g of a polyoxyethylene sorbitan tristearate (ICI Americas, Inc. Wilmington, Del.) until the surfactants dissolved.

An aqueous monomer phase is prepared by combining 36.43 g of acrylamide (49.6% solution), 8.91 g of deionized water, 1.46 g of Monomer E, 0.7 g of adipic acid, 2.8 g of sodium chloride, and 0.014 g of ethylenediaminetetraacetic acid, tetra sodium salt (Dow Chemical Co., Midland, Mich.).

The oil phase is charged to a 125 mL reactor equipped with a stir bar, a thermometer, and a nitrogen sparge tube. With vigorous stirring, the aqueous monomer phase is added to the oil phase to form a water-in-oil emulsion. This emulsion is heated to 44° C., and 0.014 g of AIBN (2,2'-azobis(isobutyrylnitrile), E. I. DuPont Nemours & Co., Inc., Wilmington, Del.) and 0.0018 g of AIVN (2,2'-azobis(2,4-dimethylvaleronitrile), E. I. DuPont Nemours & Co., Inc., Wilmington, Del.) is added. The polymerization is conducted at 44° C. for four hours and then at 70° C. for one hour.

EXAMPLE 18
Water-in-oil Emulsion Polymer Consisting of 2 Mole % Monomer F/98 Mole % Acrylamide An oil phase is prepared by heating 18.2 g of a paraffinic oil, 0.84 g of a sorbitan monooleate (ICI Americas, Inc. Wilmington, Del.), and 0.65 g of a polyoxyethylene sorbitan tristearate (ICI Americas, Inc. Wilmington, Del.) until the surfactants dissolved.

An aqueous monomer phase is prepared by combining 36.43 g of acrylamide (49.6% solution), 6.95 g of deionized water, 3.42 g of a 39.6% solution of Monomer F, 0.7 g of adipic acid, 2.8 g of sodium chloride, and 0.014 g of ethylenediaminetetraacetic acid, tetra sodium salt (Dow Chemical Co., Midland, Mich.).

The oil phase is charged to a 125 mL reactor equipped with a stir bar, a thermometer, and a nitrogen sparge tube. With vigorous stirring, the aqueous monomer phase is added to the oil phase to form a water-in-oil emulsion. This emulsion is heated to 44° C., and 0.014 g of AIBN (2,2'-azobis(isobutyrylnitrile), E. I. DuPont Nemours & Co., Inc., Wilmington, Del.) and 0.0018 g of AIVN (2,2'-azobis(2,4-dimethylvaleronitrile), E. I. DuPont Nemours & Co., Inc., Wilmington, Del.) is added. The polymerization is conducted at 44° C. for four hours and then at 70° C. for one hour. The polymer product has a RSV of 14.8 dL/g (450 ppm in 1M $NaNO_3$).

EXAMPLE 19
Water-in-oil Emulsion Polymer Consisting of 1 Mole % N,N-Dimethyl-N-(2-methacryloyloxyethyl)-N-(3-sulfopropyl)ammonium Betaine/99 Mole % Acrylamide (1-ZPAM)

An oil phase is prepared by heating 260 g of a paraffinic oil, 12 g of a sorbitan monooleate (ICI Americas, Inc. Wilmington, Del.), and 9.2 g of a polyoxyethylene sorbitan tristrearate (ICI Americas, Inc. Wilmington, Del.) until the surfactants dissolved.

An aqueous monomer phase is prepared by combining 541.33 g of acrylamide (48.7% solution), 116.5 g of deionized water, 10.47 g of N,N-Dimethyl-N-(2-methacryloyloxyethyl)-N-(3-sulfopropyl)ammonium betaine (Aldrich Chemical Company, Milwaukee, Wis.), 10 g of adipic acid, 40 g of sodium chloride, and 0.2 of ethylenediaminetetraacetic acid, terta sodium salt (Dow Chemical Co., Midland, Mich.).

The oil phase is charged to a 1.5L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.200 g of AIBN (2,2'azobis(isobutyrylnitrile), E. I. DuPont Nemours & Co., Inc., Wilmington, Del.) and 0.025 g of AIVN ((2,2'azobis(2,4-dimethylvaleronitrile), E. I. DuPont Nemours & Co., Inc., Wilmington, Del.) is added. The polymerization is conducted at 44° C. for four hours, and then at 70° C. for one hour. The polymer product has a Reduced Specific Viscosity (RSV) of 27.6 dL/g (450 ppm in 1M NaNO$_3$).

EXAMPLE 20
Water-in-oil Emulsion Polymer Consisting of 1 Mole % N,N-Dimethyl-N-(3-methacrylamidopropyl)-N-(3-sulfopropyl)ammonium Betaine/99 Mole % Acrylamide (1-ZPAM)

An oil phase is prepared by heating 260 g of a paraffinic oil, 12 g of a sorbitan monooleate (ICI Americas, Inc. Wilmington, Del.), and 9.2 g of a polyoxyethylene sorbitan tristrearate (ICI Americas, Inc. Wilmington, Del.) until the surfactants dissolved.

An aqueous monomer phase is prepared by combining 541.33 g of acrylamide (48.7% solution), 116.5 g of deionized water, 10.96 g of N,N-Dimethyl-N-(3-methacrylamidopropyl)-N-(3-sulfopropyl)ammonium betaine (Aldrich Chemical Company, Milwaukee, Wis.), 10 g of adipic acid, 40 g of sodium chloride, and 0.2 of ethylenediaminetetraacetic acid, terta sodium salt (Dow Chemical Co., Midland, Mich.).

The oil phase is charged to a 1.5L reactor equipped with an agitator, a thermocouple, a water condenser and a nitrogen sparging tube. With vigorous stirring, the aqueous monomer phase is added to the oil phase to form a water-in-oil emulsion. This emulsion is heated to 44° C., and 0.200 g of AIBN (2,2'azobis(isobutyrylnitrile), E. I. DuPont Nemours & Co., Inc., Wilmington, Del.) and 0.025 g of AIVN ((2,2'azobis(2,4-dimethylvaleronitrile), E. I. DuPont Nemours & Co., Inc., Wilmington, Del.) is added. The polymerization is conducted at 44° C. for four hours, and then at 70° C. for one hour. The polymer product has a Reduced Specific Viscosity (RSV) of 28.6 dL/g (450 ppm in 1M NaNO$_3$).

EXAMPLE 21
Polymer Solution Viscosities

The solution viscosities are calculated for a series of polymers using the efflux times measured at 30° C. in a size 75 Cannon-Ubbelohde viscometer. The viscosity measurements are performed in the following three solutions: [1] 1 M sodium nitrate solution, pH=4, and [polymer]=0.045 wt %, [2] 2 mM sodium chloride solution, pH=5.6 (8 mM succinic acid/sodium succinate buffer), 5 ppm poly (galacturonic acid) or PGA, and [polymer]=0.045 wt %, and [3] a three-fold dilution of solution #2 to yield [polymer]= 0.015 wt %. Solution [1] is used as an initial estimate of relative molecular weights of the polymers. Solution [2] is prepared as a model process water having pH=5.6, conductivity=1.5 mS/cm, and 5 ppm of a model DCS component, PGA. Solution [3] is used to obtain the concentration dependence of the viscosity in the model process water so that an intrinsic viscosity (IV) and Huggins coefficient can be calculated. The PGA used in the solutions above has a molecular weight of ~7,000.

The results citing the reduced specific viscosity (RSV) for the polymers are summarized in Table 1. In solution [1], all the polymers have similar RSV's indicating that they have comparable molecular weights. From measurements in solution [2] and [3], the 1-CPAM has the lowest IV in the PGA containing solution and the highest Huggins coefficient. The poly(ampholytic) terpolymers have the next lowest IV and a Huggins coefficient greater than one. The nonionic PAM and zwitterionic copolymers produced the highest IV and has Huggins coefficients less than one.

The results clearly demonstrate that the 1-CPAM is highly susceptible to complexation with the PGA collapsing its extended structure in solution. Even the polyampholytes showed significant reductions in polymer specific volume in the presence of PGA. Thus, although overall electrical neutrality of the polymer composition can be achieved, locally, polymer segments or strands can have a net positive (and negative) charge. The inhomogeniety of the charge distribution leaves such cationic segments and strands susceptible to PGA complexation as evidenced by a reduced IV and increased Huggins coefficient.

Only the nonionic PAM and zwitterionic copolymers have IV's greater than 15 and Huggins coefficients less than 0.8 indicating that these polymers do not change conformation significantly in the presence of PGA. The polymers are insensitive to such polyanion components which may be present in many paper furnishes and other process waters. The insensitivity to ionic species in process waters means that such polymers will be insensitive to changes/ fluctuations in such species, thereby, providing a significant benefit in terms of process control.

TABLE 1

| | Reduced Specific Viscosities | | | | |
| --- | --- | --- | --- | --- | --- |
| Polymer | [1] RSV (dL/g) | [2] RSV (dL/g) | [3] RSV (dL/g) | IV (dL/g) | Huggins Coefficient |
| 1-CPAM | 25.2 | 14.83 | 10.2 | 7.87 | 2.50 |
| 1,1-APAM[a] | 25.2 | 16.91 | 12.0 | 9.60 | 1.76 |
| 1,1-APAM[b] | 28.1 | 18.19 | 13.0 | 10.4 | 1.61 |
| 1-ZPAM[c] | 25.4 | 23.1 | 18.0 | 15.5 | 0.71 |
| 2-ZPAM[d] | 30.5 | 24.3 | 20.2 | 18.2 | 0.40 |
| 5-ZPAM[e] | 25.0 | 20.9 | 17.2 | 15.4 | 0.51 |
| PAM | 27.3 | 23.5 | 19.2 | 17.0 | 0.50 |

[a]example 12; [b]example 13; [c]example 7; [d]example 8; [e]example 9

EXAMPLE 22
Flocculation Activity in the Presence of DCS

To illustrate the effects of DCS on polymer performance, the flocculation activity of 1-CPAM and 1-ZPAM is examined in the presence and absence of DCS. A model paper furnish is prepared by washing a mill thick stock sample of hydrosulfite and peroxide bleached TMP. Washing is accomplished by repeatedly suspending and filtering the fiber sample until the conductivity of the furnish drops below 50 μS/cm. The washed fiber is diluted to 0.5 wt % with (1) an acetate buffer at pH=5.0, and (2) an acetate buffer with 10% thick stock filtration water (DCS). The flocculation of the "clean" and "dirty" furnishes are monitored using SLM. Each experiment used 300 mL of 0.5 wt % furnish mixing at 750 rpm with 2 lb/t of the flocculant added after 30 seconds of mixing and a total trial time of 90 seconds.

The flocculation results are depicted in Table 2. After polymer addition there is a rapid increase in mean chord length due to flocculation. The peak response is achieved around 40 seconds after which the shear forces of mixing destroy the flocs and reduce the mean chord length. In the "clean" furnish, the 1-CPAM and 1-ZPAM appear to perform quite similarly with a peak response ~36 microns and a decay time between 7.7 and 8.7 seconds. However, in the DCS-containing solution, the 1-CPAM peak response and final change is reduced by 50% while the 1-ZPAM performance is equivalent to its performance in the "clean" water. These relative performances are consistent with Example 21 where it is shown that 1-ZPAM is unaffected by DCS, and the cationic flocculant 1-CPAM complexes with a model DCS component. The interaction between cationic polymers and anionic trash has been well-established (*Nordic Pulp and Paper Research Journal*, 1993, 8(1), 226).

TABLE 2

| Polymer | % DCS | Peak Response (microns) | Decay Time (sec) | Final Change (microns) |
|---|---|---|---|---|
| 1-CPAM | 0 | 37.8 | 8.7 | 3.9 |
| 1-CPAM | 10 | 18.6 | 7.1 | 2.2 |
| 1-ZPAM (example 7) | 0 | 35.0 | 7.7 | 3.0 |
| 1-ZPAM (example 7) | 10 | 35.5 | 7.4 | 2.8 |

EXAMPLE 23

First Pass Retention (FPR) and First Pass Ash Retention (FPAR)

The dynamic drainage jar (DDJ) is used as standard test method for determining retention performance of a flocculent in a paper furnish (Tappi 59(2), 67, 1976). The FPR and FPAR for three flocculants are determined using the DDJ for a 100% peroxide bleached recycle furnish with a headbox consistency of 0.9 wt % (20% ash). The mixing speed is 1500 rpm and the flocculant is added after 15 seconds of furnish mixing. After 15 seconds of additional mixing, furnish drainage is initiated and the filtrate is collected at times from 20–80 seconds after flocculant addition. About 90 mL of filtrate is passed through the 200 mesh screen during the 60 second collection time. The results shown in Table 3 illustrate the superior FPR and FPAR performance of the zwitterionic flocculant relative to the nonionic and cationic polymers. Sheet properties such as brightness will be improved with an increase in FPAR. Improved filler retention suggests that the flocculant will also be beneficial in filler preflocculation applications where the flocculant is added directly to the filler slurry prior to addition to the paper furnish.

TABLE 3

| Polymer | Dosage (lb/t) | FPR (%) | FPAR (%) |
|---|---|---|---|
| PAM | 0.8 | 61.8 | 52.8 |
| 1-ZPAM (example 7) | 0.8 | 62.8 | 55.8 |
| 1-CPAM | 0.8 | 59.6 | 50.1 |

EXAMPLE 24

Floc Shear Stability

The flocculation activity of the polymers in a 100% peroxide-bleached recycle furnish is probed by scanning laser microscopy (SLM). The furnish is obtained from a mill as an untreated headbox stock at 0.9 wt % consistency. Each experiment used 300 mL of 0.8 wt % furnish mixing at 750 rpm with 0.75 lb/t of the flocculant added after 20 seconds of mixing and a total trial time of 90 seconds.

The results are shown in Table 4. The PAM has the highest peak response (35.4 microns), but the PAM induced flocs are degraded to a greater extent under the shear mixing than the 1-ZPAM. The final change for the PAM treatment is 4.0 microns which is 50% of the final change for the 1-ZPAM (8.3 microns). Addition of 1-CPAM resulted in a small peak response (7.1 microns), but the flocs which formed are quite shear stable (final change=4.5 microns). The performance of 1-APAM is similar to that of 1 CPAM. Thus, after a total time of 90 seconds, the 1-ZPAM treated furnish has the largest mean chord length of the three treatments. This means that the 1-ZPAM polymer yields larger flocs which have improved shear resistance and will translate to higher machine speeds without loss in retention performance.

TABLE 4

| Polymer | Peak Response (microns) | Decay Time (sec) | Final Change (microns) |
|---|---|---|---|
| PAM | 35.4 | 15.1 | 4.0 |
| 1-ZPAM (example 7) | 28.3 | 11.9 | 8.3 |
| 1-CPAM | 7.1 | 21.1 | 4.5 |
| 1-APAM (example 12) | 7.0 | 17.5 | 4.5 |

EXAMPLE 25

Drainage for Board Applications

The drainage times for board grade furnishes are measured for the near neutral flocculants using a dynamic drainage analyzer (DDA, Tappi Proceedings, 1990 Papermakers Conference, pp. 239–245). The furnish obtained from a mill consisted of 60% recycled old corrugated containers (OCC), 10% mixed office waste, and 30% virgin neutral sulfite semi-chemical (NSSC). The experimental conditions for the DDA are as follows: mixing speed=1000 rpm, consistency=1.2 wt %, flocculant dosage=0.5 lb/t added at 10 seconds until drain, vacuum=0.3 bar, and 200 mesh screen.

The results are shown in Table 5. The drainage time for the blank, untreated thin stock is 43 seconds. Each flocculent is effective at reducing the measured drainage times and thus improving drainage performance of the board furnish. However, the PAM is not nearly as effective as either the 1-CPAM or 1-ZPAM. The drainage time of the PAM-treated furnish is 29.3 seconds compared to 21.0 seconds for the 1-ZPAM and 1-CPAM polymers. Thus, the 1-ZPAM offers superior drainage of the board furnish while being insensitive to fluctuations in DCS as shown in examples 19 and 20 above. A lower drainage time means that one can expect an improved drainage rate on the papermachine, along with improved drainage at washing or thickening processes in the papermaking process.

TABLE 5

Drainage Times for Board Mill Furnish

| Polymer Treatment (0.5 lb/t) | Drainage Time (seconds) |
|---|---|
| Blank | 43.0 |
| PAM | 29.3 |
| 1-ZPAM (example 7) | 21.0 |
| 1-CPAM | 21.0 |

EXAMPLE 26
Drainage of Newsprint Furnishes

The drainage time of a 100% peroxide bleached recycle furnish obtained from a newsprint mill is measured using a dynamic drainage analyzer. The 0.8 wt % headbox stock is diluted to 0.21 wt % with a synthetic tap water and mixed at 1000 rpm. The dilution is done to reduce the total drainage times of the furnish. The flocculant is added at 15 seconds until drain at a dosage of 1 lb/t.

The results shown in Table 6 show that the blank, untreated furnish has a drainage time near 15.5 seconds. The addition of flocculants slow the drainage time to varying extents. The nonionic PAM is the most detrimental to drainage time (t=36.1 sec), with the 1-ZPAM (t=22.3 seconds) significantly better than PAM. The 1-CPAM is closer to the blank at 18.2 seconds, but the 5-ZPAM has the fastest drainage times of the flocculants tested (t=16.3 seconds).

In this furnish the near neutral flocculants studied did not improve drainage relative to the blank. However, the flocculation activity of these polymers can provide benefits in terms of filler retention and sheet properties, for example. The zwitterionic copolymers can offer similar flocculation performance to the nonionic PAM without the detrimental effects observed in drainage. This is a significant advantage.

TABLE 6

Drainage Times for Newsprint Mill Furnish.

| Polymer Treatment (1.0 lb/t) | Drainage Time (seconds) |
|---|---|
| Blank | 15.5 |
| PAM | 36.1 |
| 1-ZPAM (example 7) | 22.3 |
| 5-ZPAM (example 9) | 16.3 |
| 1-CPAM | 18.2 |

EXAMPLE 27
Synergy With Bentonite

A model paper furnish is prepared from a mill thick stock (peroxide-bleached TMP). The thick stock is diluted to 0.5 wt % with an acetate buffer at pH=5.0. The flocculation of the furnishes is monitored by SLM. Each experiment used 300 mL of 0.5 wt % furnish mixing at 750 rpm with 1 lb/t of the flocculant added after 20 seconds of mixing and a total trial time of 80 seconds. A swelled bentonite solution is added at 10 seconds and 2 lb/t before flocculant addition in the second set of experiments.

The flocculation results are shown in Table 7. In the absence of bentonite, the PAM and 1-ZPAM are largely ineffective in flocculating this unfilled furnish with peak responses less than 3 microns. The 1-CPAM and 5-ZPAM have significant flocculation responses when added alone. When bentonite is added before the flocculent, there is a large increase in flocculant response for all treatments. With bentonite added, the performance of the flocculant programs are quite similar having an equal peak response near 30 microns with a final change between 1.3–2.4 microns. Since the bentonite alone has no effect on the mean chord response, these results demonstrate the synergy obtained between the zwitterionic flocculants and precursor substrate, bentonite. The same synergy can be expected with other such microparticles or enhancers which work with traditional nonionic polymer flocculants.

TABLE 7

| Polymer | Peak Response (microns) | Decay Time (sec) | Final Change (microns) |
|---|---|---|---|
| 1-CPAM | 13.1 | 8.9 | 0.6 |
| PAM | 2.5 | 6.7 | 0.8 |
| 1-ZPAM (example 7) | 2.6 | 32.3 | 0 |
| 5-ZPAM (example 9) | 15.5 | 5.0 | 1.0 |
| Bent/1-CPAM | 31.1 | 7.4 | 2.0 |
| Bent/PAM | 29.4 | 5.6 | 2.4 |
| Bent/1-ZPAM | 29.2 | 9.4 | 1.5 |
| Bent/5-ZPAM | 29.5 | 7.4 | 1.3 |

EXAMPLE 28
Synergy With Coagulant

A furnish consisting of 70% peroxide-bleached groundwood and 30% kraft is treated with a series of flocculants, with and without coagulant, using the DDJ and dynamic drainage analyzer (DDA). For DDJ experiments, the mixing speed is 1500 rpm and 0.8 lb/t of the flocculent is added at 25 seconds. After 15 seconds of additional mixing, furnish drainage is initiated and the filtrate is collected at times from 20–80 seconds after flocculant addition. About 100 mL of filtrate is passed through the 200 mesh screen during the 60 second collection time and filtrate turbidities are recorded after a two-fold dilution (Hach DR-2000). For comparative experiments a cationic coagulant polymer is added at 5.0 lb/t ten seconds before flocculent addition. The representative coagulant had a charge demand of 7.3 meq/g and MW~200,000. For DDA experiments, the furnish is diluted threefold while maintaining the same additive dosing sequence. The DDJ filtrate turbidities and DDA drainage times (Table 8) show that the zwitterionic polymer had the best filtrate clarity and fastest drainage time with coagulant addition relative to the nonionic or cationic flocculant treatments. The combination of low filtrate turbidities and fast drainage rates means that zwitterionic flocculants should be beneficial when applied to pulp washing and thickening processes in the papermill as well.

TABLE 8

| Additive | DDJ Filtrate Turbidities (NTU) | DDA Drainage Time (seconds) |
|---|---|---|
| Blank | 5231 | 56 |
| 0.8 lb/t 1-CPAM | 4990 | 55 |
| 0.8 lb/t PAM | 4651 | >120 |
| 0.8 lb/t 1-ZPAM (example 7) | 4674 | 65 |
| 5.0 lb/t coagulant & 0.8 lb/t 1-CPAM | 4806 | 45 |
| 5.0 lb/t coagulant & 0.8 lb/t PAM | 4597 | 50 |
| 5.0 lb/t coagulant & 0.8 lb/t 1-ZPAM | 4436 | 42 |

EXAMPLE 29
Recycling Water

A thick stock of 100% peroxide-bleached recycle (67.3 g of 4.47 wt %) is diluted with DCS (133 g) and deionized water (100 g) to yield a 1.0 wt % model headbox stock. SLM characterization of flocculant treatment at 0.5 lb/t is followed by filtration through a 200 mesh screen. This filtrate (233 g) is used to dilute the thick stock (67.3 g of 4.47 wt %) for the next model headbox stock. The SLM results for the first and fourth run are shown below for PAM and 1-ZPAM (example 7) in Table 9. The flocculation activity of each furnish looks quite similar for the first treatment with a peak response ~6.5 microns and a final change 0.4–0.9 microns. By the third recycle of filtrate water ($4^{th}$ run), the PAM peak response is reduced by 50% while the 1-ZPAM peak response remains similar. The requirements of white water chemistry for each flocculant to exhibit activity is different, and the flocculants can have a separate effect on the concentration of DCS in the white water. These results demonstrate the differences in chemical treatment program on the DCS concentration and thus overall program performance.

TABLE 9

| Polymer (Run #) | Peak Response (microns) | Decay Time (sec) | Final Change (microns) |
| --- | --- | --- | --- |
| PAM (1) | 6.5 | 17.3 | 0.6 |
| PAM (4) | 2.9 | 16.5 | 0.2 |
| 1-ZPAM (1) | 6.4 | 10.9 | 0.9 |
| 1-ZPAM (4) | 6.1 | 10.4 | 0.8 |

What is claimed is:

1. A high molecular weight water-soluble zwitterionic water in oil emulsion, dispersion or gel polymer comprising from about 98 to about 99.9 mole percent of one or more nonionic monomers and from about 0.1 to about 2 mole percent of one or more zwitterionic monomers of formula

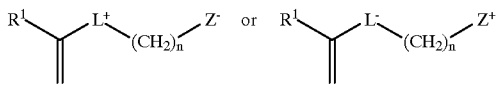

wherein $L^+$ is a group of formula

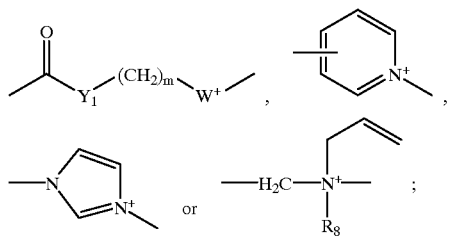

$L^-$ is a group of formula

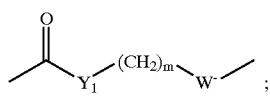

$R_1$ and $R_8$ are independently hydrogen or methyl;

$R_2$, $R_3$, $R_4$, $R_5$ and $R_6$ are independently selected from the group consisting of hydrogen and $C_1$–$C_4$ alkyl;

$Y_1$ and $Y_2$ are independently selected from the group consisting of O or $NR_2$;

$W^+$ is —$S^+R_3$— or —$N^+R_2R_3$—;

$W^-$ is

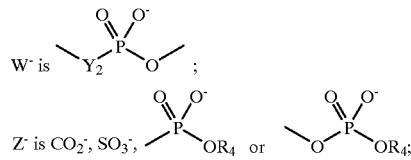

$Z^-$ is $CO_2^-$, $SO_3^-$, $Z^+$ is —$N^+R_5R_6R_7$;

m is 2 or 3; and n is 1–5.

2. The high molecular weight water-soluble zwitterionic polymer of claim 1 wherein the nonionic monomers are selected from the group consisting of acrylamide, methacrylamide, N-methylacrylamide, N,N-dimethyl(meth)acrylamide, N-isopropy(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol)monomethyl ether mono(meth)acrylate, N-vinyl-2-pyrrolidone, glycerol mono((meth)acrylate), 2-hydroxyethyl(meth)acrylate, vinyl methylsulfone and vinyl acetate.

3. The high molecular weight water-soluble zwitterionic polymer of claim 1 wherein the nonionic monomers are selected from the group consisting of acrylamide and methacrylamide.

4. The high molecular weight water-soluble zwitterionic polymer of claim 1 wherein the nonionic monomer is acrylamide.

5. The high molecular weight water-soluble zwitterionic polymer of claim 1 wherein the nonionic monomer is acrylamide and the zwitterionic monomer is

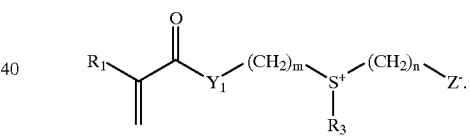

6. The high molecular weight water-soluble zwitterionic polymer of claim 1 wherein the nonionic monomer is acrylamide and the zwitterionic monomer is

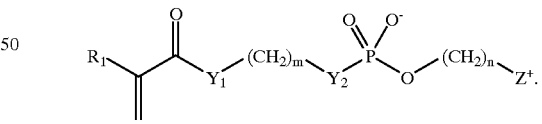

7. The high molecular weight water-soluble zwitterionic polymer of claim 1 wherein the nonionic monomer is acrylamide and the zwitterionic monomer is

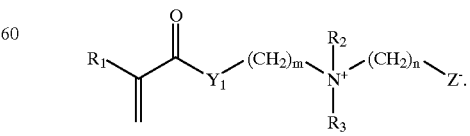

8. The high molecular weight water-soluble zwitterionic polymer of claim 1 wherein the nonionic monomer is acrylamide and the zwitterionic monomer is selected from the group consisting of N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-methacryloyloxyethyl-N-(3-sulfopropyl)-ammonium betaine, N,N-dimethyl-N-methacrylamidopropyl-N-(3-sulfopropyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate and

[(2-acryloylethyl)dimethylammonio]methyl phosphonic acid.

9. The high molecular weight water-soluble zwitterionic polymer of claim 1 wherein the nonionic monomer is acrylamide and the zwitterionic monomer is selected from the group consisting of N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-methacryloyloxyethyl-N-(3-sulfopropyl)-ammonium betaine and N,N-dimethyl-N-methacrylamidopropyl-N-(3-sulfopropyl)-ammonium betaine.

10. A method for increasing retention and drainage in fibrous suspensions of pulp during processing of said pulp comprising adding to the pulp an effective flocculating amount of the high molecular weight water-soluble zwitterionic polymer of claim 1.

11. The method of claim 10 further comprising adding bentonite, microparticles, or resin enhancers to the pulp.

12. The method of claim 10 further comprising adding coagulant to the pulp.

13. A method of removing suspended solids and clarifying white water in the papermaking process comprising adding to the white water, pulp washers, or thickeners an effective flocculating amount of the high molecular weight water-soluble zwitterionic polymer of claim 1.

14. A method of increasing filler retention comprising adding an effective flocculating amount of the high molecular weight water-soluble zwitterionic polymer of claim 1 to the filler slurry prior to addition to the paper furnish.

* * * * *